US008412750B2

(12) United States Patent
Quin

(10) Patent No.: US 8,412,750 B2
(45) Date of Patent: Apr. 2, 2013

(54) LDAP TO SQL DATABASE PROXY SYSTEM AND METHOD

(75) Inventor: Spencer Quin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 460 days.

(21) Appl. No.: 11/234,267

(22) Filed: Sep. 26, 2005

(65) Prior Publication Data

US 2007/0073703 A1   Mar. 29, 2007

(51) Int. Cl.
*G06F 17/30* (2006.01)
(52) U.S. Cl. ......... 707/809; 707/770; 707/796; 709/220
(58) Field of Classification Search .................. 707/3, 1, 707/9, 10, 999.003, 999.001, 999.009, 770, 707/796, 809; 709/220
See application file for complete search history.

(56) References Cited

U.S. PATENT DOCUMENTS

| 6,345,266 | B1* | 2/2002 | Ganguly et al. | 707/1 |
|---|---|---|---|---|
| 6,347,312 | B1* | 2/2002 | Byrne et al. | 707/3 |
| 6,356,892 | B1* | 3/2002 | Corn et al. | 707/3 |
| 6,985,905 | B2* | 1/2006 | Prompt et al. | 707/102 |
| 2002/0078004 | A1* | 6/2002 | Ambrosini et al. | 707/1 |
| 2002/0083340 | A1* | 6/2002 | Eggebraaten et al. | 713/201 |
| 2002/0169858 | A1* | 11/2002 | Bellinger et al. | 709/220 |
| 2003/0191757 | A1 | 10/2003 | Ambrosini et al. | |
| 2003/0191759 | A1* | 10/2003 | Harvey | 707/4 |
| 2004/0024808 | A1* | 2/2004 | Taguchi et al. | 709/203 |
| 2005/0114846 | A1* | 5/2005 | Banks et al. | 717/136 |
| 2005/0278417 | A1* | 12/2005 | Fremantle et al. | 709/203 |
| 2006/0020586 | A1* | 1/2006 | Prompt et al. | 707/3 |
| 2006/0235850 | A1* | 10/2006 | Hazelwood et al. | 707/9 |

OTHER PUBLICATIONS

S. Yoder, "Setting up LDAP with back-sql"; Aug. 5, 2004; (http://www.flatmtn.com/computer/Linux-LDAP.html).*
ORACLE, "Developing Orcale Internet Directory Server Plugin"; ORACLE 2003.*
S.S.B. Shi, E. Stokes, D. Byrne, C.F. Corn, D. Bachman, T. Jones; "An Enterprise directory solution with DB2", Nov. 2, 2000, vol. 39, pp. 360-383.
European Search Report including European Search Opinion from European Patent Application No. 05108882.1.

* cited by examiner

*Primary Examiner* — Dennis Truong
(74) *Attorney, Agent, or Firm* — Gowling Lafleur Henderson LLP

(57) ABSTRACT

An LDAP to SQL proxy to adapt a relational database as a directory service for an LDAP client is provided. The database may be defined in accordance with a database schema which is external to an LDAP server serving the LDAP client. The proxy comprises LDAP to SQL query and response mappings preferably for a reduced set of LDAP operations. The proxy may comprise a mechanism to maintain a plurality of persistent database connections to reduce query processing overhead. The proxy may further be adapted to maintain persistent connections to each of at least two alternative databases for executing queries to provide enhanced failsafe operations. A plurality of LDAP to SQL proxied databases may be configured for sharing query loads to enhance scalability and performance.

16 Claims, 4 Drawing Sheets

LDAP TO SQL DATABASE PROXY SYSTEM AND METHOD

FIELD OF INVENTION

The present matter relates generally to computer system integration and particularly to facilitating database activity between otherwise incompatible computer system components.

BACKGROUND OF THE INVENTION

Configuring a computer system to perform specific functions (for example, electronic commerce, web services, business transaction processing, electronic data communications, etc.) often includes the integration of disparate hardware and software from various sources. A particular component for such a system may be configured for operation with one or more other components in accordance with a first protocol. However, a systems integrator may wish to have the particular component operate with a specific other component that does not support that first protocol For example, it is often desired to integrate a data store component comprising a directory or other database with another component of a system. Data stores are typically defined in accordance with specific schemas and protocols for accessing information in the data store. One such protocol is the Structured Query Language (SQL) for accessing relational database management system (RDBMS) databases and another is Lightweight Directory Access Protocol (LDAP) for providing access to directory services, specifically, X.500-based directory services optimized for reading, searching and browsing information. Each has particular advantages or other characteristics which may make its use desirable in a computer system. For example, LDAP is adapted as a network protocol for accessing information in a directory and can be easy to implement in a client component for accessing information stored remotely. It is often used for email clients to access directory information (e.g. an address book). SQL-based databases are available widely from different vendors and provide complex functionality including transactional support and roll-back schemes not typically found with LDAP directories.

Sometimes a data store in a computer system is to be shared by multiple components that are configured for different protocols. Thus there are times when a component and a data store are incompatible, for example, with the data store configured for SQL operation and the component configured for LDAP operation.

One implementation of LDAP is OpenLDAP, an open source community developed software data store coordinated by the OpenLDAP Foundation. One component of this software is a LDAP server for providing LDAP access to data stored in one or more backends. OpenLDAP provides access to various backends or storage types (i.e. types of databases) through specific modules. OpenLDAP is configured to provide backends of three general categories, namely those that 1) store data, 2) proxy otherwise stored data or 3) generate data on the fly. One proxy backend is back-sql for mapping an SQL based RDBMS to a directory service agent (DSA). Examples of supported RDBMSes are DB2 from IBM, MySQL from MYSQL AB and PostgreSQL from PostgreSQL Global Development Group.

However, as back-sql proxies an SQL-database for multiple purposes and the schema is predefined by the needs of OpenLDAP, it performs more work than may be necessary and incurs more overhead (storage and other resources) than may be desired such that its performance characteristics are not suitable. Black-sql is configured to use its own proprietary database schema rather than an external database schema even if an existing SQL database is defined in accordance with its respective database schema.

Accordingly, there is a need for a simple LDAP to SQL database proxy.

BRIEF DESCRIPTION OF THE DRAWINGS

An embodiment or embodiments will now be described by way of example only with reference to the following drawings in which.

For convenience, like numerals in the description refer to like structures in the drawings.

DETAILED DESCRIPTION OF THE PREFERRED EMBODIMENT

There is provided an LDAP to SQL proxy to adapt a relational database as a directory service for one or more LDAP clients typically served by an LDAP server. The proxy comprises LDAP to SQL query and response mappings preferably but not necessarily for a reduced set of LDAP operations. The proxy may comprise a mechanism to maintain a plurality of persistent database connections to reduce query processing overhead. The proxy may be further adapted to maintain a plurality of persistent connections to each of at least two alternative databases for executing queries to provide enhanced failsafe operation A plurality of LDAP to SQL proxied databases may be configured for sharing query loads to enhance scalability and performance. The proxy may be configured as a module for providing a backend relational database to an LDAP server. Advantageously, the database may be defined in accordance with a database schema that is external to the LDAP server to facilitate integration of an existing database to an LDAP environment and avoid duplication.

Figure 1:
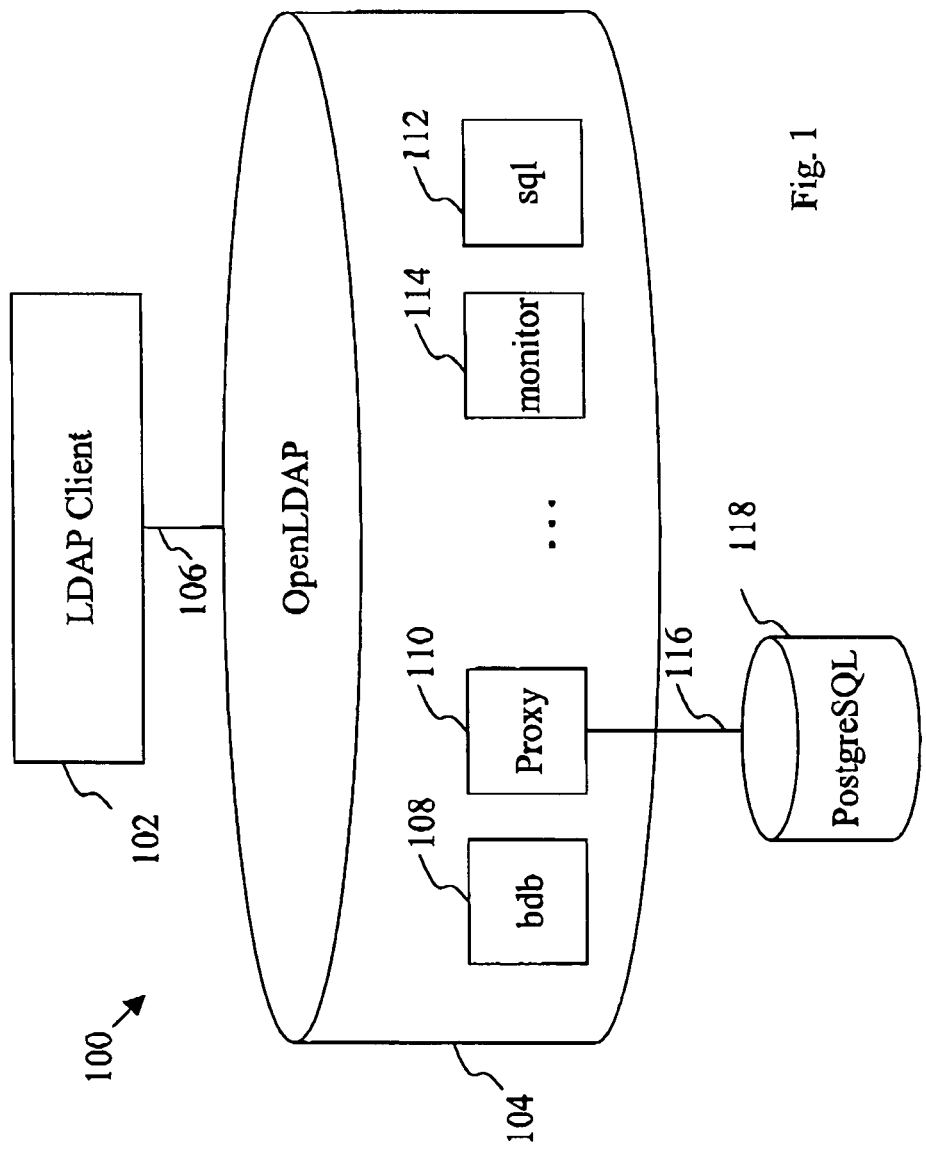
FIG. 1 is a block diagram of an IDAP server with an LDAP to SQL proxy module in accordance with an embodiment.

FIG. 1 illustrates a representative computer system 100 in which a first component 102 comprises a LDAP client for accessing directory services provided by a LDAP server 104 over a communication coupling 106. However, the backend data store (second component) is an RDBMS 118 accessible via SQL. In the present embodiment, the LDAP server is configured as an OpenLDAP server (slapd daemon) for a LINUX operating system environment having a plurality of standard modules for various backends, such as but not limited to, bdb 108, sql 112 and monitor 114. LDAP server 104 is adapted with a backend proxy module 110 for communicating SQL queries via communication coupling 116 to database 118, which in this embodiment is an exemplary PostgreSQL database defined in accordance with a database schema maintained externally of the LDAP server 104. Couplings 106 and 116 may be public or private networks, local or wide area networks etc. or other communication channels. Other SQL-based databases or LDAP servers may be used rather than those shown and described. Some OpenLDAP modules need not be provisioned if not needed, for example, back-sql, back-bdb, etc.

Requests from LDAP client 102 for directory services (typically queries for obtaining information stored to the backend 118) are communicated in accordance with an LDAP protocol to LDAP server 104. Server 104 invokes proxy 10 which transforms the LDAP queries to SQL for communicating to database 118. Responses from database 118 are received in accordance with the SQL protocol and transformed by proxy module 110 to LDAP protocol responses for sending back to LDAP client 102 via server 104, requests to modify or store information. As such, the proxy module will consume fewer resources than a fuller SQL proxy implementation such as back-sql. Additionally and importantly, the proxy permits use or integration of an existing database particularly when it is desirable not to change the existing database (i.e. define a new schema). Thus an SQL database with its existing schema may be efficiently integrated with components configured for using LDAP. Duplicate tables etc. need not be created as is the result of using a second schema for the same data.

In a preferred implementation, proxy module 110 (back-prox) is configured in C programming language for OpenLDAP as set forth in Table 1:

TABLE 1

| File Name | Purpose |
|---|---|
| back-prox.h | Defines structures and constants that are required by all of the files in the module. The structures are used to pass information between functions. |
| connectionpool.h | This is a header file for the connection pool. |
| connectionpool.c | This file contains the functions for initializing, maintaining and cleaning up the connection pool. |
| external.h | This header defines the functions for the external interface to the rest of OpenLDAP. This file is required by each module. |
| init.h init.c | Header file used to initialize the module. |
| search.h | Header file for the searching functions. Also defines structs for converting LDAP attribute names to SQL column names. |
| search.c | When a search is performed the functions defined in this file are used to translate the incoming query, send it to a Postgres backend, and then package the result into an LDAP response. |
| bind.c | This file contains the functions that are used when a user attempts to bind to a node in OpenLDAP. This is where the authentication against both the server and user credentials takes place. |

Figure 2:
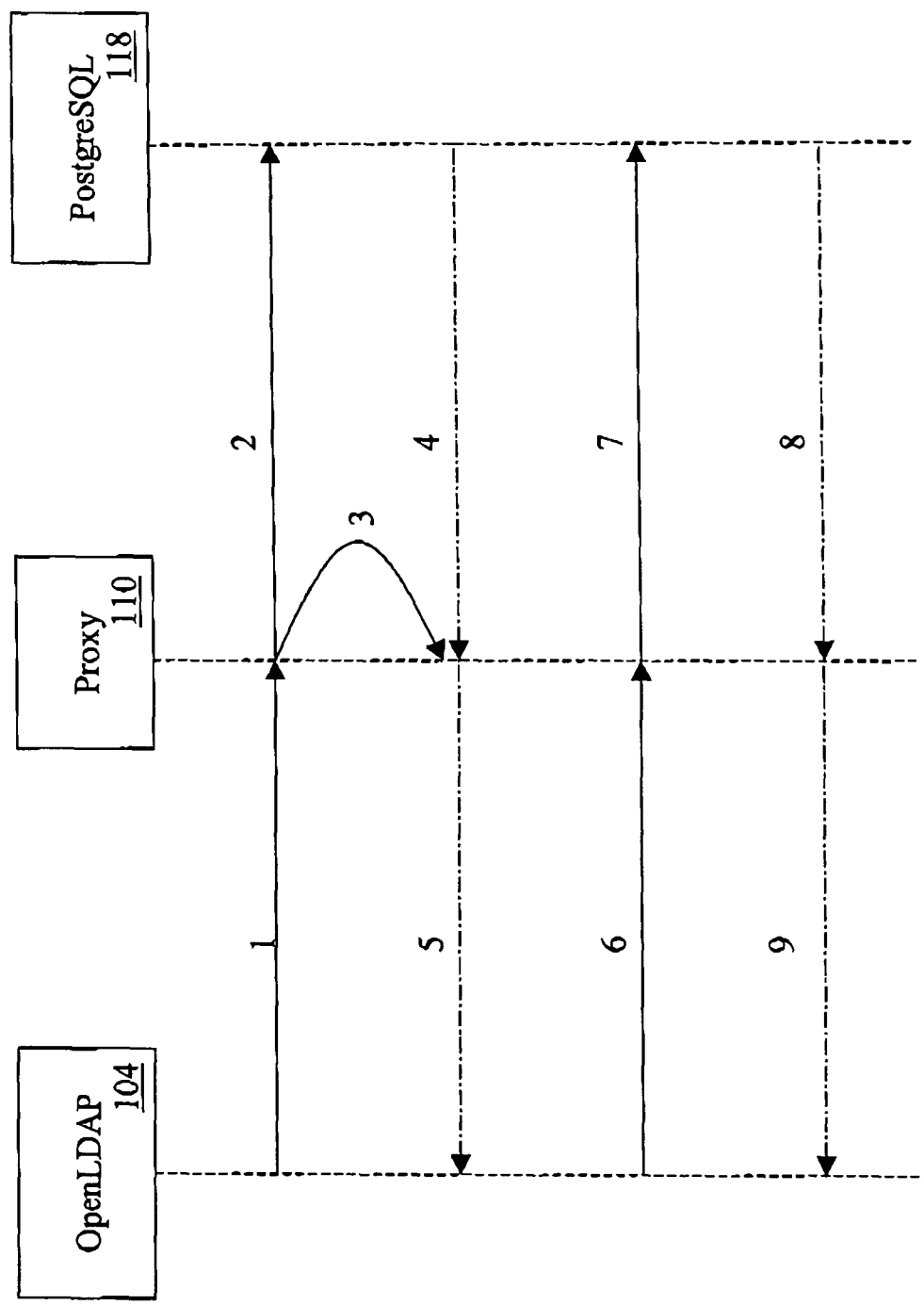
FIG. 2 is a block diagram of message processing in accordance with an embodiment.

FIG. 2 illustrates an example of "message" operations between server 104, proxy module 110 and database 118. It is understood that "message" herein means information communicated or otherwise passed from one component to another and need not be restricted to data communicated in a defined message form via a communication network. Message 1 comprises a supply of credentials for server 104 and client 102. Proxy module 110 transforms the message to provide the client credentials to the database 118 (message 2) and authenticates the server credentials locally, providing a result (message 3). Upon receipt of the SQL result of the authentication request (message 4), proxy module 10 provides a transformed LDAP result (message 5) to server 104. Message 5 is thus dependent on the results of the two authentications. Message 6 comprises an LDAP query which is transformed and sent as a SQL query (message 7). The SQL response (message 8) is received (e.g. a set of records from the external database) and transformed to an LDAP response (message 9).

Proxy module 110 may be configured with knowledge of the requirements of the LDAP client and the specific directory services to be provided to it. As a result, a specific set of LDAP to SQL and vice versa transformations may be determined and implemented to provide reduced LDAP directory services and operations. Proxy module 110 thus maps incoming message formats to outgoing formats efficiently without necessarily implementing maps for all types of LDAP service requests and SQL queries and responses. For example, if LDAP client 102 is limited to retrieving (i.e. searching and reading) information from a directory, LDAP to SQL proxy module 110 need not be configured to facilitate LDAP To reduce transactional overhead for handling queries, a pool of persistent connections is maintained for reusably connecting to the external database. The connections may be shared in a round robin or other sharing fashion as is known to those of ordinary skill in the art. Further operations are described herein below with reference to FIG. 4 wherein a preferred proxy maintains a connection pool for each of two alternative databases (a local copy and a remote master) to query.

The following functions map the function pointers from OpenLDAP 104 to the actual implementation in the proxy module 110 (i.e. back-prox in the preferred embodiment). Functions that are set to 0 have no implementation and the 0 is the default return value to indicate success.

```
bi->bi_open = 0;
bi->bi_config = 0;
bi->bi_close = 0;
bi->bi_destroy = 0;
bi->bi_db_init = backprox_db_init;
bi->bi_db_config = backprox_db_config;
bi->bi_db_open = backprox_db_open;
bi->bi_db_close = backprox_db_close;
bi->bi_db_destroy = backprox_db_destroy;
bi->bi_op_abandon = 0;
bi->bi_op_compare = 0;
bi->bi_op_bind = backprox_bind;
bi->bi_op_unbind = backprox_unbind;
bi->bi_op_search = backprox_search;
bi->bi_op_modify = 0;
bi->bi_op_modrdn = 0;
bi->bi_op_add = 0;
```

-continued

```
bi->bi_op_delete = 0;
bi->bi_chk_referrals = 0;
bi->bi_operational = 0;
bi->bi_connection_init = 0;
bi->bi_connection_destroy = 0;
```

Functions that do not have an implementation were either not necessary or were redundant and not used because the implementation was done in a different function. The corresponding functions can be found throughout the rest of the module. The BackendInfo structure that is being referred to by the variable bi is defined in slap.h and is used to pass information, function pointers and semaphores between the various functions in the module. A brief description of the implementations of the functions in the modules follows in Table 2. Each of the *_db_* descriptions comes from the slap.h file.

TABLE 2

| Function | Description |
|---|---|
| bi_db_init | Called to initialize each database, called upon reading 'database <type>' called only from backend_db_init( ) |
| bi_db_config | Called to configure each database, called per database to handle per database options called only from read_config( ) |
| bi_db_open | Called to open each database called once per database immediately AFTER bi_open( ) calls but before daemon startup. Called only by backend_startup( ) |
| bi_db_close | Called to close each database called once per database during shutdown but BEFORE any bi_close call. Called only by backend_shutdown( ) |
| bi_db_destroy | Called to destroy each database called once per database during shutdown AFTER all bi_close calls but before bi_destory calls. Called only by backend_destory( ) |
| bi_op_bind | Called on a bind operation. |
| bi_op_unbind | Called on an unbind operation. |
| bi_op_search | Called on a search operation. |

The standard configuration file for OpenLDAP is called the slapd.conf file and can often be found at /etc/openldap on a Linux machine for a standard installation The back-prox module comprises additional parameters that are read on startup from the backprox_db_config( ) function in the init.c file. Table 3 lists the new parameters and their roles.

TABLE 3

| Parameter | Description |
|---|---|
| cell_dbuser | The login name of the cell database user. |
| cell_dbpasswd | The password of the cell database user. |
| cell_dbname | The name of the database instance to log into. |
| cell_dbhost | The host machine of the cell database. |
| primary_dbuser | The login name of the primary database user. |
| primary_dbpasswd | The password of the primary database user. |
| primary_dbname | The name of the database instance to log into. |
| primary_dbhost | The host machine of the primary database. |
| connection_pool_size | The number of persistent connections in each of the connection pools. There is one pool for the local copy and one for the master database. |
| reconnect_interval | When a database goes down, this is the polling frequency that the reconnection thread will use. |

Figure 3:
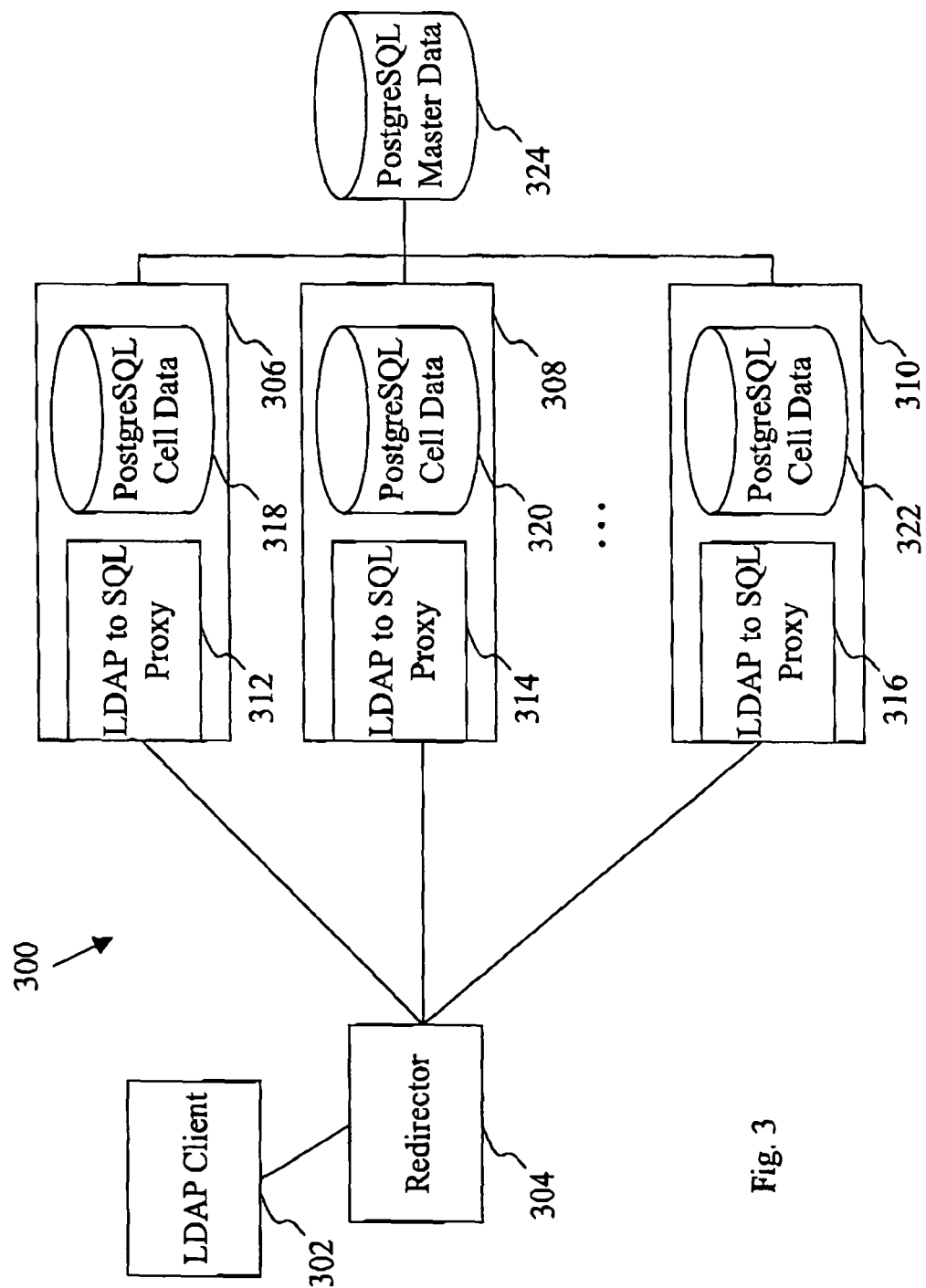
FIG. 3 is a block diagram of an computer system architecture providing a plurality of SQL databases to an LDAP client via LDAP to SQL proxies in accordance with an embodiment.

Mapping of LDAP attributes to SQL and vice versa may be performed in a variety of ways including table look-ups etc. as will be understood to persons of ordinary skill in the art, FIG. 3 illustrates a block diagram of a computer system 300 for providing scalable and redundant directory services to an LDAP client. In system 300, there is a master database 324 which is replicated to a plurality of cells 306, 308 and 310 each cell comprising a cell database (318, 320 and 322) fronted by a respective LDAP to SQL proxy component (312, 314 and 316) for providing the directory services to the LDAP client 302. A query from the LDAP client 302 is directed to a particular one of the n cells 306, 308 and 310 by a redirector component 304 (typically a server configured for load sharing) to share load among the cells and provide for scalable and redundant service. LDAP to SQL proxy component 312, 314 and 316 may comprise an OpenLDAP server with a LDAP to SQL proxy module as previously described and further described below.

Figure 4:
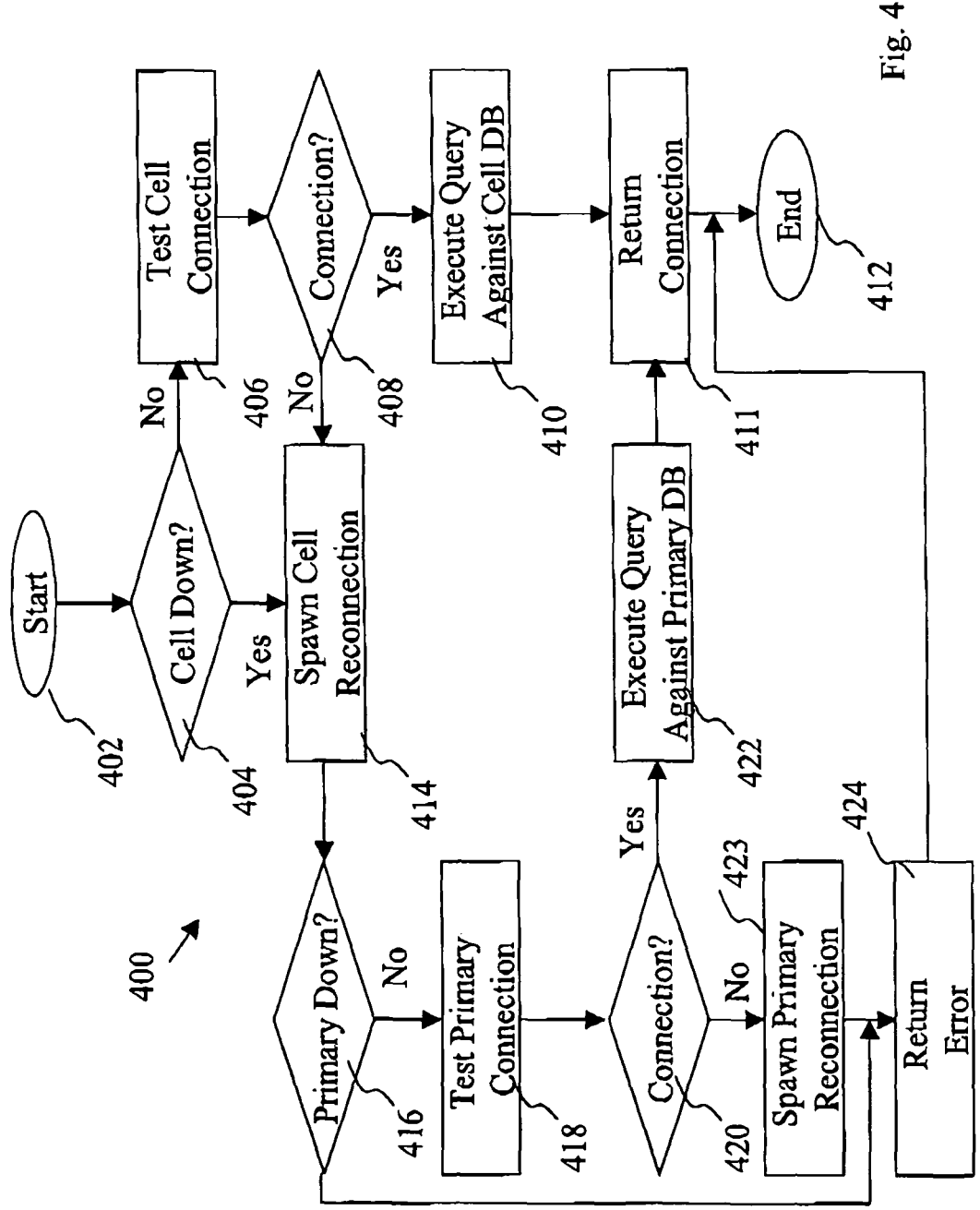
FIG. 4 is a flow chart of operations in accordance with the embodiment of FIG. 3.

A request for directory services to a particular cell may be serviced from that cell's database, a local copy of the master database, or from the master database should the local copy database not be available. FIG. 4 illustrates a flow chart of operations 400 for a connection pool of a cell (e.g. of the LDAP to SQL proxy) to determine which of the cell database and master database to direct the transformed LDAP to SQL query. In order to decrease processing, a flag may be set to indicate to the proxy not to attempt to use any of its connections in the cell connection pool. A background thread may be-executed to re-establish connections to the cell database when it becomes available, periodically retrying as necessary until successful. The thread can rebuild the connections and reset the flag before terminating, Operations 400 commence following receipt of a query to service at start step 402. The cell down flag is checked at step 404. If it is not down, via No branch to step 406, the cell connection is tested and a result determined (step 408). If the cell connection is OK, via Yes branch to step 410, the transformed LDAP to SQL query is executed against the cell's local database. The connection is returned to the pool (step 411) and operations for that query end (step 412). If the connection did not test OK at step 408 or the cell flag was set at step 404, via respective branches to step 414, cell reconnection is spawned and operations attempt to query the master database.

Steps 416-423 are performed relative to the master database and are similar to steps 404-410 as performed relative to the cell database. If a query cannot be completed against either the cell database or the master database, at step 424 an error is returned and operations finish (step 412).

In a preferred implementation, system 300 may comprise a portion of an electronic mail system. LDAP client 302 may comprise an electronic mail server for providing electronic mail via web access to users of the mail service such as is available from Mirapoint, Inc. Such a server may be integrated with other user provisioning services etc. and require access to external databases storing such user information etc.

Although an embodiment or embodiments, sometimes preferred, have been described herein, it will be understood by those skilled in the art that variations may be made thereto without departing from the spirit of the invention or the scope of the appended claims.

What is claimed is:

1. A method of providing lightweight data access protocol (LDAP) directory services comprising:
    at an LDAP server comprising an LDAP to SQL (structured query language) proxy module, configuring the module to:
        receive and responding to LDAP directory service requests with at least one LDAP client;
        determine a reduced set of the LDAP directory services based on credentials of the LDAP client, wherein the LDAP directory service requests includes at least one of retrieving from, storing information to, and modifying information of an SQL database;

configure the proxy module in real time to implement in real-time the specific directory services to be provided to the LDAP client, based on the reduced set of the LDAP directory services;

map the received LDAP service requests to SQL queries according to the reduced set of the LDAP directory services; and execute the SQL queries against the SQL database to obtain SQL query results and map the SQL query results to LDAP responses;

wherein the SQL database is defined by a database schema maintained externally to and separate from the LDAP server and the LDAP server is operable to use the schema.

2. The method according to claim 1 wherein the LDAP to SQL proxy module maps LDAP service requests sufficient to facilitate only information retrieval from the database.

3. The method according to claim 1 wherein the LDAP server is configured as an OpenLDAP server.

4. A non-transitory computer readable medium comprising instructions, which, when executed by a computing device, adapt an LDAP server for providing directory services to connect an SQL database configured for SQL operation to at least one LDAP client configured for LDAP operation, said instructions comprising:

receive and responding to LDAP directory service requests with at least one LDAP client;

determine a reduced set of the LDAP directory services based on credentials of the LDAP client, wherein the LDAP directory service requests includes at least one of retrieving from, storing information to, and modifying information of an SQL database;

configure the proxy module in real time to implement in real-time the specific directory services to be provided to the LDAP client, based on the reduced set of the LDAP directory services;

map the received LDAP service requests to SQL queries according to the reduced set of the LDAP directory services; and execute the SQL queries against the SQL database to obtain SQL query results and map the SQL query results to LDAP responses;

wherein the SQL database is defined by a database schema-maintained externally to and separate from the LDAP server and the LDAP server is operable to use the schema.

5. The computer readable medium according to claim 4 wherein the instructions perform table lookups to transform LDAP to SQL attributes and vice versa.

6. The computer readable medium according to claim 4 wherein the instructions maintain a pool of persistent connections to the database for executing queries.

7. The computer readable medium according to claim 4 wherein the instructions maintain a pool of persistent connections to each of a cell database and a master database for executing queries to enhance failsafe operations.

8. A computer system comprising:
(a) at least one lightweight data access protocol LDAP server for providing directory services, the at least one server comprising:
(b) an LDAP to Structured Query Language SQL proxy module configured for adapting the LDAP server to connect a database accessible by SQL to at least one LDAP client, the proxy module configured to:

receive and responding to LDAP directory service requests with at least one LDAP client;

determine a reduced set of the LDAP directory services based on credentials of the LDAP client, wherein the LDAP directory service requests includes at least one of retrieving from, storing information to, and modifying information of an SQL database;

configure the proxy module in real time to implement in real-time the specific directory services to be provided to the LDAP client, based on the reduced set of the LDAP directory services;

map the received LDAP service requests to SQL queries according to the reduced set of the LDAP directory services; and execute the SQL queries against the SQL database to obtain SQL query results and map the SQL query results to LDAP responses;

wherein the SQL database is defined by a database schema-maintained externally to and separate from the LDAP server and the LDAP server is operable to use the schema.

9. The computer system according to claim 8 wherein each group of LDAP server, LDAP to SQL proxy and database defines a cell and said computer system further comprising a master database accessible by each cell.

10. The computer system according to claim 9 further comprising a redirector server to share directory service requests among the cells.

11. The computer system according to claim 9 wherein each proxy in a particular cell is configured to execute directory service requests against the master database if the database of the particular cell is unavailable.

12. The computer system according to claim 11 wherein each proxy maintains a plurality of persistent connections to each of the database of the proxy's cell and the master database, said connections providing access to execute said SQL queries to enhance failsafe operations.

13. The method according to claim 1 wherein each group of a LDAP server, a proxy module and a database defines a cell, the method further comprising the provision of a master database accessible to each cell.

14. The method of claim 13 further comprising the provision of a redirector server for sharing directory service requests among the cells.

15. The method of claim 13 wherein each proxy module in a particular cell is configured to execute directory service requests against the master database if a database of the particular cell is unavailable.

16. The system according to claim 8 wherein the LDAP server is an Open LDAP server.

* * * * *